United States Patent [19]
Moran

[11] 4,443,233
[45] Apr. 17, 1984

[54] MIST SEPARATOR

[75] Inventor: Thomas M. Moran, Maryland Heights, Mo.

[73] Assignee: Monsanto Company, St. Louis, Mo.

[21] Appl. No.: 412,328

[22] Filed: Aug. 27, 1982

[51] Int. Cl.³ .............................................. B01D 46/00
[52] U.S. Cl. .................... 55/97; 55/257 PP; 55/259; 55/315; 55/525
[58] Field of Search ............... 55/97, 315, 259, 320, 55/525, 526, 527, 528, 487, 486, 498, 257 PP; 210/484, 485, 498

[56] References Cited

U.S. PATENT DOCUMENTS

| | | | |
|---|---|---|---|
| 2,389,435 | 11/1945 | Karlstrom | 55/514 |
| 3,679,062 | 7/1972 | Burkhart | 210/499 |
| 4,086,070 | 4/1978 | Argo et al. | 55/97 |
| 4,233,042 | 11/1980 | Tao | 55/498 |
| 4,249,918 | 2/1981 | Argo et al. | 55/97 |
| 4,300,918 | 11/1981 | Cary | 55/97 |
| 4,319,898 | 3/1982 | Maierhofer | 55/501 |

FOREIGN PATENT DOCUMENTS

| | | | |
|---|---|---|---|
| 778040 | 7/1957 | United Kingdom | 55/DIG. 37 |
| 861844 | 3/1961 | United Kingdom | 55/482 |

*Primary Examiner*—Bernard Nozick
*Attorney, Agent, or Firm*—Lawrence L. Limpus

[57] ABSTRACT

An apparatus for the removal of particulates from a flowing gas stream and a process for its use are provided. A perforated screen separator formed as a plate having parallel rows of perforations formed by pushing alternating strips of the plate material forward and backward from the plane of the plate is used. The perforated screen separator may be used alone or with a fiber bed mist eliminator for increased particulate removal.

9 Claims, 6 Drawing Figures

FIG. 5.

36
37
39
38
AEROSOL CONTAINING GAS IN
CLEANED GAS OUT

FIG. 6.

42 AIR OUT
50
REENTRAINMENT SAMPLE POINT
44
40
45
43
49 ELEMENT LOADING
P2
P1
AIR IN
41
47 ← AIR
← OIL
48
DRIP PAN LOADING

MIST SEPARATOR

BACKGROUND OF THE INVENTION

This invention relates to an improved mist separator in which a perforated screen is used with a fiber bed separator. More particularly, this invention relates to an improved type of perforated screen which may be used to economically remove large particles from a gas stream at a low pressure drop, either as an independent mist separator or in combination with a fiber bed element or other mist control device. More specifically, this invention relates to an improved type of perforated screen which can remove particles from a gas stream more efficiently and economically than conventional baffles.

DESCRIPTION OF THE PRIOR ART

Among the earliest efforts to remove aerosols from flowing gas streams was the use of baffles which operated by forcing the flowing gas to change its direction of flow. As the gas flow changed its direction, the aerosols having a heavier mass impinged upon the baffle surface and were therefore removed from the flowing gas stream. The baffle efficiency is increased by forcing the gas stream to make more abrupt turns as it flows through the baffles. However, due to the increased fabrication costs of the high efficiency baffle designs, most commercial baffles are only adequate for removal of aerosols generally larger than ten microns in diameter where the larger particle inertia causes the particles to strike the baffle rather than to continue to flow with the gas stream around the baffle. It does not effectively remove the smaller aerosols which, because of their low mass, will tend to flow around the baffle with the gas.

A mesh pad or filter is also used to remove aerosols from flowing gas streams. Normally, to avoid creating a significant pressure drop which would require higher power requirements to move the gas, such mesh pads or filters are fabricated of such large fiber diameters that only particles generally larger than three microns in diameter are removed from the flowing gas stream with any high degree of efficiency.

More recently fiber bed separators have found wide spread use. Through proper selection of the fiber size, the packing density of the fibers, and the depth of the beds, a high collection efficiency may be obtained for aerosols of less than three microns in diameter that the baffles or mesh pad would be unable to collect. As shown in U.S. Pat. No. 4,086,070, fiber beds having different characteristics may be placed in fiber-to-fiber contact with one another to increase the collection efficiency of aerosols, particularly submicron and larger aerosol particulates which earlier collection devices were unable to effectively remove from the gas stream, and to allow a faster gas velocity through the fiber bed separator without a decrease in the collection efficiency or an increase in the re-entrainment of the aerosols.

Re-entrainment of collected liquids from the downstream surface of a fiber bed is often a problem with fiber bed separators. When the aerosol being removed from the flowing gas stream is a mixture of particulates ranging in size from submicron to a few microns, a portion of the particles collected by the fibers can be coalesced into larger particles and removed from the fiber bed by the flowing gas stream. To reduce this re-entrainment of the aerosols, a less efficient fiber bed separator may be used, the velocity of the gas stream through the fiber bed separator may be reduced to enable the liquid to more effectively drain from the fiber bed, or an additional separator such as a baffle or a mesh pad may be installed downstream from the fiber bed.

Currently, fiber bed separators are designed to avoid re-entrainment by providing a bicomponent fiber bed such as that shown in U.S. Pat. No. 4,086,070 or by designing the fiber bed such that the gas velocity through the bed and/or the aerosol loading of the gas stream are sufficiently low that the amount of re-entrained particles are held within practical or acceptable limits. This latter approach requires larger sizing of the fiber bed separator to provide greater bed surface area than would otherwise be needed and results in higher equipment cost per unit volume of gas treated.

SUMMARY OF THE INVENTION

It is an object of this invention to provide a mist separator which can be used to separate large liquid or solid particulates from a flowing gas stream.

A further object of this invention is to provide a mist separator in the form of a perforated screen which can be used to separate large liquid or solid particulates from a flowing gas stream by causing the particulates to impact on the perforated screen while the flowing gas stream makes abrupt changes in direction.

It is an object of the invention to provide a perforated screen which will have a very low pressure drop and a very high collection efficiency for particles generally larger than ten microns in diameter while allowing significantly higher gas velocities than have been used heretofore.

Another object of this invention is to provide a perforated screen which may be used upstream and/or downstream of a mesh pad or fiber bed separator to increase their collection efficiency.

It is recognized that the mist separator of this invention may be utilized alone as an independent mist control device to remove large sized particulates from the flowing gas stream or that the mist separator may be used in combination with fiber bed separators or mesh pads to greatly increase their collection efficiency while allowing much higher gas velocities through the fiber bed elements or mesh pads.

These and other objects are obtained by the use of a perforated screen separator formed as a plate having parallel rows of perforations. The perforations are formed as slots in the plate by pushing alternate strips of the plate material forward and backward from the original plane of the plate without removing any of the plate material. The plate of the perforated screen separator will thus have numerous parallel slots with the plate material positioned alternately in front of and behind each slot such that a tortuous path is formed; that is, a gas stream passing through each slot is subjected to two abrupt changes in direction.

DESCRIPTION OF THE DRAWINGS

FIG. 5 is a cutaway perspective view of the perforated screen of this invention being used on both the upstream and downstream surfaces of a mesh pad or fiber bed mist eliminator.

FIG. 6 is a cutaway view of an installation used to test the perforated screen of this invention.

DESCRIPTION OF THE PREFERRED EMBODIMENTS

Figure 1:
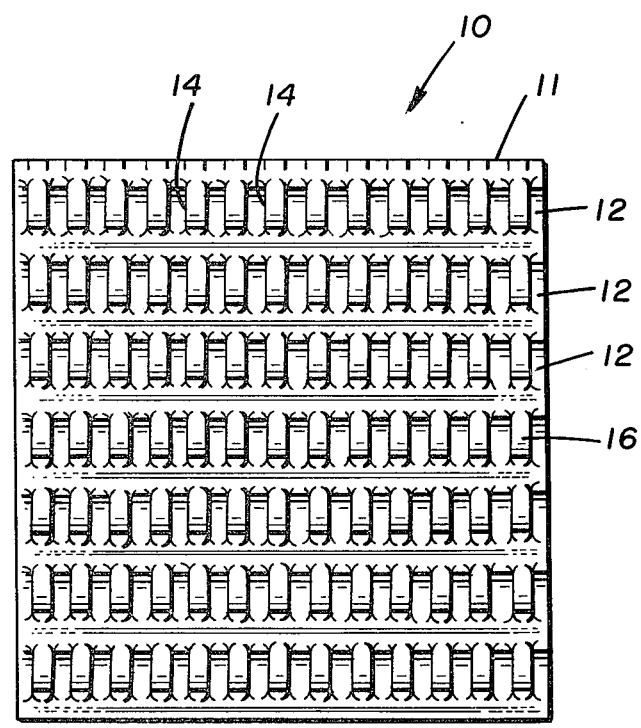
FIG. 1 is a front view of an example of the perforated screen of this invention.
Figure 2:
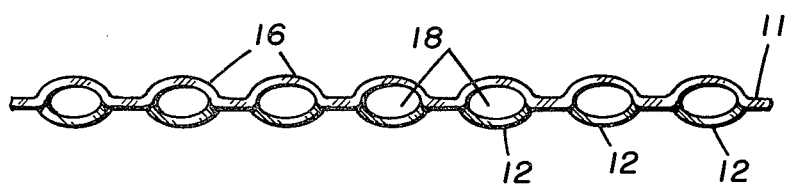
FIG. 2 is an end view of an example of the perforated screen of this invention.

An example of the mist separator of this invention is clearly shown in FIGS. 1 and 2. The mist separator is shown as a perforated screen 10 formed as a plate having rows of alternating parallel perforations 12. The perforations 12 or slots are formed by making rows of parallel cuts 14 of the desired length and spacing in the plate 11. The cuts 14 are of equal length throughout the plate 11 and each cut is spaced a calculated distance from its adjacent parallel cut. The cuts 14 may be spaced equidistantly or have any other desired varying spacing. The bands of metal 16 formed between the cuts 14 are then deformed to the desired shape to create the perforations through which the gas will flow. Adjacent bands of metal 16 will be deformed in opposite directions forward and backward from the plane of the plate such that the plate 11 will appear to have slots when its face is observed. As is most clearly shown in FIG. 2, the bands of metal 16 are deformed by pushing the alternate bands of metal 16 forward and backward from the plane of the plate 11. At the same time, the bands of metal 16 are given a desired shape which may be, for example, round, square, triangular, or oval when viewed from the side of the plate as in FIG. 2, as the width, length, and depth and shape of the slots may be varied to change the performance or operating characteristics of the perforated screen separator. This configuration forms a screen which requires the gas stream to follow a tortuous path; that is, the gas stream must make two abrupt turns as it passes through the perforated screen separator 10. This design for the perforated screen separator 10 is such that light shining perpendicular to the face of the plate 11 virtually will not pass through the plate. For a given gas velocity, the pressure drop and the collection efficiency of the perforated screen separator 10 may be varied, in accordance with design criteria known to those skilled in the art, by varying the length and width of the slots formed between the bands of metal 16 and the shape and size of the opening 18 formed between the adjacent bands of metal 16 as they are alternatively pushed forward and backward from the plane of the plate 11 to form the perforations through the plate. The openings 18 which provide the flow path for the gas stream between the bands of metal 16 may be shaped in the form of a circle, a square, a triangle, an oval, or any other desired shape.

In use, the perforated screen separator 10 separates aerosols from flowing gas streams by causing the larger aerosol particles to impact upon the bands of metal 16 while the gas stream makes abrupt changes in direction in order to pass through the plate 11. A perforated screen separator 10 may be used whenever it is desirable to economically remove large particles, particularly those having a diameter greater than 10 microns, from a gas stream while maintaining a low pressure drop across the separator and allowing a high gas velocity. As an example, at a superficial gas velocity of 2.5 meters per second the pressure drop can be as low as 6.35 kilograms per square meter and the collection efficiency can be greater than 80% for particulates having a density of at least one gram per cubic centimeter and an aerodynamic diameter greater than 10 microns. A collection efficiency of essentially 100% may be achieved for the particulates greater than 15 microns in diameter.

Figure 3:
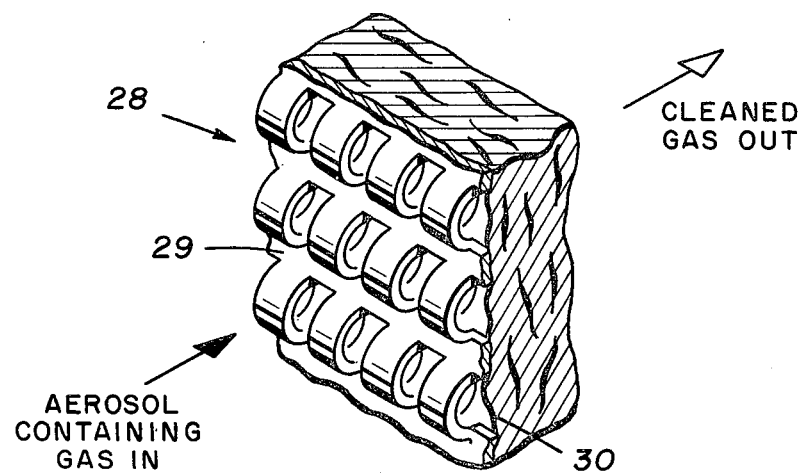
FIG. 3 is a cutaway perspective view of the perforated screen of this invention being used on the upstream surface of a mesh pad or fiber bed mist eliminator.

FIG. 3 is a cutaway perspective view of the perforated screen of this invention being used in intimate contact with the upstream surface of a mesh pad or fiber bed mist eliminator to form a bicomponent impaction separator 28. The perforated screen separator 29, shown on the upstream surface of the mesh pad or fiber bed mist eliminator 30, is representative of the mist separator 10 described above and shown in FIGS. 1 and 2.

Figure 4:
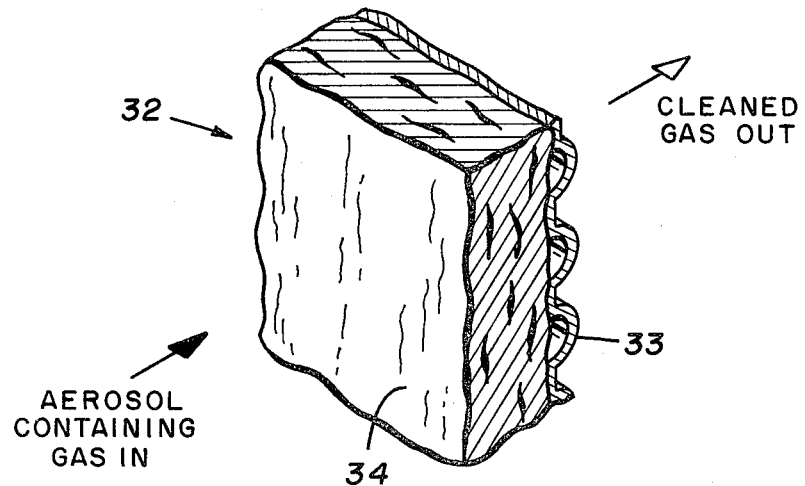
FIG. 4 is a cutaway perspective view of the perforated screen of this invention being used on the downstream surface of a mesh pad or fiber bed mist eliminator.

FIG. 4 is a cutaway perspective view of the perforated screen of this invention being used in intimate contact with the downstream surface of a mesh pad or fiber bed mist eliminator to form a bicomponent impaction separator 32. The perforated screen separator 33, shown on the downstream surface of the mesh pad or fiber bed mist eliminator 34, is representative of the mist separator 10 described above and shown in FIGS. 1 and 2.

FIG. 5 is a cutaway perspective view of the perforated screen of this invention being used in intimate contact with both the upstream and downstream surfaces of a mesh pad or fiber bed mist eliminator to form a bicomponent impaction separator 36. The perforated screen separator 37, shown on the upstream surface of the mesh pad or fiber bed mist eliminator 38, and the perforated screen separator 39, shown on the downstream surface of the mesh pad or fiber bed mist eliminator 38, are each representative of the mist separator 10 described above and shown in FIGS. 1 and 2. As noted above, the operating characteristics and the separation efficiency of the perforated screen separators 37 and 39 shown in FIG. 5, as well as the perforated screen separators 29 and 33 shown in FIG. 3 and FIG. 4 respectively, can be varied by modifying the shape of the screen openings and the slot dimensions. In this manner, the differential pressure across the perforated screen separator may also be varied.

The fiber bed mist eliminator shown in FIGS. 3, 4, and 5 is formed as a thickness of randomly oriented fibers which may be made from glass, metal, ceramic, or plastic in which the fiber diameters may vary from a diameter of about 5 microns to a diameter of about 1,000 microns. The fiber bed is formed such that the bed has a void fraction of from about 85% to about 98%. Such a fiber bed is typically formed by winding a roving of fiber on, on packing it within, an annulus formed between a pair of cylindrical wire screens, by forming mats of the fibers and compressing them between wire screens, or by packing bulk quantities of fibers within an annulus formed between a pair of cylindrical wire screens. The construction of a fiber bed for use with this invention is greatly similar to the manner in which such fiber bed mist eliminators are usually constructed. However, for this invention, perforated screen separators are used in addition to or in place of one or both of the wire screens which are typically used to contain the fiber bed material, depending upon whether the perforated screen separator is desired upstream of a fiber bed mist eliminator as shown in FIG. 3, downstream of a fiber bed mist eliminator as shown in FIG. 4, or both upstream and downstream of a fiber bed mist eliminator as shown in FIG. 5.

During operation of a bicomponent impaction separator 36, as shown in FIG. 5, the aerosl-containing gas first must pass through the perforated screen separator 37. As the gas passes through the perforated screen separator 37, essentially all particles having a size greater than 10 microns are removed from the gas. If the bicomponent impaction separator 36 is oriented in a vertical position, or in any position other than in a horizontal plane, the liquid which is removed by the perforated screen separator 37 drains by gravity to the bottom of the separator 37 and, as it drains, removes solid particulates from the surface of the perforated screen. The remaining aerosols in the gas stream, which are essentially mist and particles having a size of less than 10 microns, pass through and are collected by the fiber bed mist eliminator 38. The selection of the fiber size and the void fraction within the bed are determinative of the collection efficiency and the size of the aerosols which may be collected within the fiber bed mist eliminator 38. For a typical fiber bed mist eliminator, aerosols having a diameter of approximately 0.5 microns or greater, will be collected within the fiber bed. It is possible, however, for the fiber bed mist eliminator to be constructed to collect substantially all submicron size and larger particles from the gas stream. As the aerosols are collected within the fiber bed mist eliminator 38, and as they drain from the bed, they will agglomerate to thus form larger particles and droplets of collected mist. The gas stream flowing through the fiber bed will carry a portion of these agglomerated particles to the downstream surface of the fiber bed and may have a tendency to cause some re-entrainment of these particles. However, the quantity of re-entrained particles is a lesser quantity than would occur if the perforated screen separator 37 was not present to reduce the aerosols reaching the fiber bed mist eliminator 38. The perforated screen separator 39 may be used at the downstream surface of the fiber bed mist eliminator to further reduce the quantity of re-entrained larger particles. Although the construction and operation of a bicomponent impaction separator 36 have been described as having the perforated screen separators 37 and 39 in intimate contact with the upstream surface and downstream surface respectively of the fiber bed mist eliminator 38, such a construction is not essential to the operation of this invention. It is possible, and in some cases preferable, to remove the perforated screen separators 37 and 39 from the face of the fiber bed mist eliminator 38, and to install the perforated screen separators 37 and 39 at a chosen or prdetermined position upstream and downstream respectively from the fiber bed mist eliminator 38. The bicomponent impaction separator 36 is oriented in a vertical plane in FIG. 5 with gas flow passing horizontally through the separator. The bicomponent impaction separator 36, or the perforated screen separators 37 and 39 individually, may also be installed in a horizontal plane with a vertical gas flow, or at any angle between the vertical and horizontal positions.

In operation, the upstream perforated screen separator 37 is used to collect essentially all particles greater than 10 microns, which in many cases represents a significant portion of the total entrained aerosol loading within the gas stream, while maintaining a low pressure drop across the separator. Removal of these larger aerosols reduces plugging and/or the hydraulic loading within the fiber bed mist eliminator 38, thereby maintaining its efficiency in collecting the smaller sized aerosols. In addition, the substantial reduction in the particulate loading within the fiber bed will reduce the pressure drop across the fiber bed mist eliminator 38, and thus reduce the pressure drop across the bicomponent impaction separator 36 such that the pressure drop is lower than that expected if the fiber bed mist eliminator 38 were used without the perforated screen separators 37 and 39. The perforated screen separator 39, downstream of the fiber bed mist eliminator 38, prevents re-entrainment of any large particulates that may pass through the fiber bed mist eliminator 38. The high collection efficiency of the fiber bed mist eliminator 38 is therefore used to collect and agglomerate only those particles where it enjoys an efficiency advantage, that is, for the collection of aerosols having a diameter of from substantially less than one micron to approximately 10 microns. Since the pressure drop across the bicomponent impaction separator 36 is reduced while collection efficiency is maintained, gases containing higher quantities of aerosol loadings may be cleaned or more gas may be passed through the separator by increasing the gas velocity.

The operation of the bicomponent impaction separator 36 shown in FIG. 5 is fully described above. The bicomponent impaction separator 28 of FIG. 3, which has a perforated screen separator 29 on the upstream face of the fiber bed mist eliminator 30, operates in a substantially similar manner. The upstream perforated screen separator 29 is used to collect essentially all particles greater than 10 microns and the fiber bed mist eliminator 30 collects substantially all submicron size and larger particulates from the gas stream. As the aerosols are collected within the fiber bed mist eliminator 30, and as they drain from the bed, they will agglomerate to thus form larger particles and droplets of collected mist. The gas stream flowing through the fiber bed will carry a portion of these agglomerated particles to the downstream surface of the fiber bed and may have a tendency to cause some re-entrainment of these particles. The bicomponent impaction separator 28 would primarily be used when the gas stream flowing through the fiber bed has a velocity and particle loading such that only minimal re-entrainment would occur or when the re-entrainment of a small amount of the particles will not affect the downstream process.

Operation of the bicomponent impaction separator 32 shown in FIG. 4 is somewhat different from that of the bicomponent impaction separators shown in FIGS. 3 and 5. The bicomponent impaction separator 32 shown in FIG. 4 consists of a fiber bed mist eliminator 34 which has a perforated screen separator 33 in intimate contact with the downstream surface of the fiber bed. The fiber bed mist eliminator collects the aerosols which are present within the flowing gas stream. As the aerosols are collected, and as they drain from the fiber bed, they will agglomerate to form large particles and droplets of collected mist. The gas stream flowing through the fiber bed will carry a portion of these agglomerated particles to the downstream surface of the fiber bed and may have a tendency to cause some re-entrainment of these particles. The perforated screen separator 33 substantially reduces the quantity of re-entrained particles. The bicomponent impaction separator 32 is used primarily in gas streams in which a perforated screen separator upstream of the fiber bed would be of little use, that is, in gas streams in which the aerosols have a diameter of less than 10 microns, and in gas streams in which it is imperative that the re-entrainment of particulates be reduced to a minimum.

FIG. 6 shows the test apparatus that was used to show the performance of a bicomponent impaction separator 45 utilizing a single perforated screen separator upstream of the fiber bed. The vessel 40 is provided which has an entrance for air flow 41 and an exit 42. Within the vessel 40 is support plate 43 which provides a seal against air flow through the vessel and provides support for a bicomponent impaction separator 45. The bicomponent impaction separator 45 is constructed as a cylindrical fiber bed mist eliminator formed in the annulus between two retaining screens with one end of the cylinder attached to support plate 43 and a cover plate 44 attached to the other end so that air flow must pass radially through the fiber bed. A cylindrical perforated screen separator is installed within the cylindrical fiber bed at the upstream, interior face of the fiber bed. The perforated screen separator is removable; thus, the performance of the bicomponent impaction separator 45 may be measured with and without the perforated screen separator. The tests, therefore, compare the performance of the bicomponent impaction separator with the performance, when the perforated screen separator is removed, of a fiber bed mist eliminator. Air flow through the vessel passes through entrance 41 and is channeled by support plate 43 into the interior of the cylindrical bicomponent impaction separator 45. The air stream passes radially through the bicomponent impaction separator 45 and through exit 42 to pass from vessel 40. Spray nozzle 47 is located within the incoming air stream upstream from the bicomponent impaction separator 45. Compressed air and oil are provided to the spray nozzle 47 to form an aerosol mist of atomized oil particles which are carried by the air stream passing through vessel 40 into the bicomponent impaction separator 45. A drip pan 48 with a sealed drain was provided to collect and measure the aerosols collected by the perforated screen separator on the upstream, interior surface of the bicomponent impaction separator 45. Support plate 43 was provided with a sealed drain 49 to collect and measure the aerosol mist collected by the fiber bed element of the bicomponent impaction separator 45. A cascade impactor re-entrainment measurement device 50 was positioned within exit 42 to isokinetically sample the amount of the aerosol which was not collected by the bicomponent impaction separator 45. Pressure gauges P1 and P2 were used to measure the pressure upstream and downstream of the fiber bed element or the bicomponent impaction separator 45 to calculate the pressure drop across each device.

Four tests were performed utilizing the test apparatus shown in FIG. 6. For these tests, a fiber bed mist eliminator was constructed having 0.1 square meter of flow area and a thickness of 2.2 centimeters. The glass fiber was compacted to a density of 0.1 gram per cubic centimeter and the fiber used had a diameter of approximately 28 microns. In tests 1 and 2, a perforated screen separator was not used, the fiber bed element was subjected to heavy loading, and a substantial amount of re-entrainment occurred while the system was operated at steady state process conditions. In tests 3 and 4, a perforated screen separator was installed at the upstream, interior face of the fiber bed to form the bicomponent impaction separator 45 as described above, and the system was again operated at steady state process conditions. The perforated screen separator had a total open area of 37.8% of the surface area of the plate and the width of each slot was 0.32 centimeter. The results of these tests are shown in Table 1 in which the following abbreviations are used:

MPS Meters per second
MMH$_g$ Millimeters of mercury
G/M$^3$ Grams per cubic meter As is shown in the test results, the addition of the perforated screen separator greatly reduced the loading of the fiber bed element and substantially eliminated the problem of re-entrainment of the aerosols while operating at steady state process conditions. In addition, the use of the perforated screen separator with the fiber bed element produced a reduced differential pressure across the total bicomponent impaction separator. It is thus seen that the use of the perforated screen separators of this invention will increase the collection efficiency by reducing the re-entrainment of aerosols and may reduce the differential pressure across the element while doing so.

TABLE 1

| DATA POINT | PERFORATED SCREEN SEPARATOR USED | BED VELOCITY (MPS) | TOTAL LOADING (G/M$^3$) | DRIP PAN LOADING (G/M$^3$) | ELEMENT LOADING (G/M$^3$) | OVERALL ΔP (MMHg) | ELEMENT >3 MICRON RE-ENTRAINMENT (G/M$^3$) |
|---|---|---|---|---|---|---|---|
| 1 | NO | 1.46 | 18.1 | 2.7 | 15.4 | 7.19 | 0.40 |
| 2 | NO | 1.48 | 18.9 | 2.7 | 16.2 | 7.25 | 0.33 |
| MEAN | | 1.47 | 18.5 | 2.7 | 15.8 | 7.22 | 0.36 |
| 3 | YES | 1.49 | 14.2 | 11.0 | 3.2 | 5.96 | .004 |
| 4 | YES | 1.47 | 21.8 | 18.3 | 3.5 | 5.96 | .006 |
| MEAN | | 1.48 | 18.0 | 14.6 | 3.4 | 5.96 | .005 |

The results of a similar test are shown in Table 2. For this second test, the bicomponent impaction separator 45 was constructed as a cylindrical fiber bed mist eliminator within the annulus formed between concentric cylinders formed using a perforated screen separator and a conventional wire retaining screen. A perforated screen separator was used, in place of the conventional wire retaining screen, in intimate contact with the fibers of the upstream, interior surface of the cylindrical fiber bed. The fiber bed mist eliminator was constructed of glass fiber having a diameter of approximately 28 microns which was packed to a bed thickness of 2.6 centimeters and bed density of 0.1 gram per cubic centimeter. The perforated screen separator had a total open area of 37.8% of the surface area and the width of each slot was 0.32 centimeter. In Table 2 the following abbreviations are used:

MPS Meters per second
G/M$^3$ Grams per cubic meter

The results shown in Table 2 show that the perforated screen separator which was in intimate contact with the upstream surface of the fiber bed removed approximately 97% of the total inlet aerosols without carryover into the fiber bed separator.

TABLE 2

| GAS VELOCITY (MPS) | TOTAL INLET LOADING (G/M³) | LARGE PARTICLE LOADING REMOVED BY PERFORATED SCREEN SEPARATOR (G/M³) | REMAINING SMALL PARTICLE LOADING REMOVED BY FIBER BED (G/M³) | MIST REMOVAL BY PERFORATED SCREEN SEPARATOR (%) |
|---|---|---|---|---|
| 2.6 | 17.3 | 16.85 | 0.45 | 97.4 |
| 2.2 | 8.5 | 8.26 | 0.24 | 97.1 |

As shown in the rest results of Table 1 and Table 2, the perforated screen separators of this invention may be used to efficiently separate large liquid or solid particulates from a flowing gas stream while maintaining a very low pressure drop across the elements. The perforated screen separators may be used independently or in conjunction with a mesh pad, fiber bed separator, or other device for the removal of aerosols from gas streams. As an independently used device, the perforated screen separators may be used alone or with two or more in series. The separators may be positioned vertically, horizontally, or at any angle in between. Perforated screen separators in series may be spaced from one another at any convenient distance greater than about 1.25 centimeters without significantly affecting their performance.

Operation of the perforated screen separator of this invention was compared in Table 3 with the performance of conventional baffle configurations. The efficiency of one piece of perforated screen was measured using a water mist in a gas stream traveling at a superficial velocity of 2.6 meters per second. The baffle efficiencies were calculated in accordance with Perry's Chemical Engineers' Handbook, 4th Edition, McGraw-Hill Book Company 1963, Section 20, pages 67–68. The efficiency measured using the perforated screen separator and the efficiencies calculated for the comparable baffles are shown in Table 3 below. The baffles used in the calculations had a width which ranged from 0.32 centimeters to 1.27 centimeters and from 2 to 25 baffles were used. In practice, perfect alignment of independent conventional baffle plates is very difficult to achieve which causes some of the aerosol particles to pass through the baffles. In contrast, each perforated screen separator is in perfect alignment as a result of its method of fabrication. The efficiency of the perforated screen was measured for particles having a size of 10 microns and the baffle's efficiency was calculated using a similar size particle.

Pressure drop across the perforated screen separator can be very low, for example, less than 6.35 kilograms per square meter at a gas flow rate of 2.5 meters per second, and collection efficiencies for particles having a diameter of approximately 15 microns and larger can be virtually 100%. A perforated screen may be used whenever it is desirable to economically remove large particles, those having a diameter greater than 10 microns, from a gas stream at low pressure drop, either as an independent mist control device or upstream and/or downstream of other mist control devices to enhance their performance.

The foregoing description of this invention is not intended as limiting as many variations or modifications may be made without departure from the spirit and scope of this invention.

I claim:

1. An apparatus for removing particles from a flowing gas stream comprising a perforated screen separator and a fiber bed mist eliminator downstream from said perforated screen separator, said perforated screen separator being a plate having parallel rows of perforations, said perforations being formed by making cuts in said plate to define parallel rows of strips and pushing alternate strips forward and backward from the plane of the plate to produce said parallel rows of perforatons with said strips remaining alternately in front of and behind said perforations to form a tortuous path for said flowing gas stream, and said fiber bed mist eliminator being a thickness of randomly oriented fibers having a void fraction of from about 85% to about 98%, said fibers having a diameter from about 5 microns to about 1000 microns.

2. The apparatus of claim 1 further including a second perforated screen separator downstream from said fiber bed mist eliminator.

3. The apparatus of claim 1 or 2 wherein said perforated screen separator and said fiber bed mist eliminator are in intimate contact.

4. An apparatus for removing particles from a flowing gas stream comprising a perforated screen separator and a fiber bed mist eliminator upstream from said perforated screen separator, said perforated screen separator being a plate having parallel rows of perforations, said perforations being formed by making cuts in said plate to define parallel rows of strips and pushing alternate strips forward and backward from the plane of the plate to produce said parallel rows of perforations with said strips remaining alternately in front of and behind said perforations to form a tortuous path for said flow-

TABLE 3

| TARGET WIDTH (CENTIMETERS) | TARGET SPACING (CENTIMETERS) | TYPE OF TARGET | ALIGNMENT ERROR (CENTIMETERS) | NUMBER OF TARGETS REQUIRED | 10 MICRON COLLECTION EFFICIENCY (%) |
|---|---|---|---|---|---|
| 0.32 | — | Perf. Screen | 0 | 1 | 83.3 |
| 0.32 | any ≧ 1.27 | Perf. Screen | 0 | 2 | 97.2 |
| 0.32 | any ≧ 1.27 | Perf. Screen | 0 | 3 | 99.5 |
| 0.32 | 0.32 | Baffles | 0 | 2 | 69.9 |
| 0.32 | 0.32 | Baffles | 0.08 | 3 | 77.3 |
| 0.64 | 0.64 | Baffles | 0 | 4 | 75.7 |
| 0.64 | 0.64 | Baffles | 0.08 | 5 | 79.7 |
| 0.95 | 0.95 | Baffles | 0 | 8 | 72.9 |
| 0.95 | 0.95 | Baffles | 0.08 | 10 | 78.2 |
| 1.27 | 1.27 | Baffles | 0 | 25 | 77.3 | ing gas stream, and said fiber bed mist eliminator being a thickness of randomly oriented fibers having a void fraction of from about 85% to about 98%, said fibers having a diameter from about 5 microns to about 1000 microns.

5. An apparatus for removing particles from a flowing gas stream comprising:
 a perforated screen separator, said perforated screen separator being a plate having parallel rows of perforations, said perforations being formed by making cuts in said plate to define parallel rows of strips and pushing alternate strips forward and backward from the plane of the plate to produce said parallel rows of perforations with said strips remaining alternately in front of and behind said perforations to form a tortuous path for said flowing gas stream; and
 a fiber bed mist eliminator downstream from said perforated screen separator, said fiber bed mist eliminator being a thickness of randomly oriented fibers having a void fraction of from about 85% to about 98%, said fibers having a diameter from about 5 microns to about 1000 microns.

6. The apparatus of claim 5 wherein said perforated screen separator and said fiber bed mist eliminator are in intimate contact.

7. A process for removing particles from a particle-containing flowing gas stream comprising:
 providing a perforated screen separator in said flowing gas stream, said perforated screen separator being a plate having parallel rows of perforations, said perforations being formed by making cuts in said plate to define parallel rows of strips and pushing alternate strips forward and backward from the plane of the plate to produce said parallel rows of perforations with said strips remaining alternately in front of and behind said perforations to form a tortuous path for said flowing gas stream;
 causing said particle-containing gas to flow through said perforated screen separator; and
 removing said particles having a diameter of at least approximately 10 microns from said flowing gas stream by impingement of said particles upon the surface of said perforated screen separator.

8. The process of claim 7 further including:
 installing a mist control device downstream from said perforated screen separator, and
 removing said particles having a diameter of less than approximately 10 microns from said flowing gas stream.

9. The process of claim 8 wherein said mist control device is a fiber bed separator or a mesh pad.

* * * * *